United States Patent [19]

Armell et al.

[11] 4,429,566
[45] Feb. 7, 1984

[54] PIPING LEAKAGE DETECTION METHOD AND APPARATUS

[75] Inventors: Richard A. Armell, Montrose, Scotland; John G. Misselbrook, Hawridge Common, Nr.Chesham, England

[73] Assignees: Boc-Nowsco Limited, London, England; Drexel Oil Field Service (HK) Limited, Hong Kong, Hong Kong

[21] Appl. No.: 177,468

[22] Filed: Aug. 12, 1980

[30] Foreign Application Priority Data

Aug. 13, 1979 [GB] United Kingdom ............... 7928076

[51] Int. Cl.³ ............................................. G01M 3/22
[52] U.S. Cl. ..................................... 73/40.7; 73/49.1
[58] Field of Search .................... 73/40.7, 46, 49.1; 138/90

[56] References Cited

U.S. PATENT DOCUMENTS

| 2,255,921 | 3/1939 | Fear . | |
|---|---|---|---|
| 2,481,013 | 9/1949 | Henderson | 138/90 |
| 2,578,500 | 12/1951 | Bernard | 23/232 |
| 2,731,827 | 1/1956 | Loomis | 73/40.5 |
| 3,165,920 | 1/1965 | Loomis | 166/147 |
| 3,199,598 | 8/1965 | Loomis | 73/49.1 X |
| 3,342,061 | 9/1967 | Morris | 73/40.5 |
| 3,345,868 | 10/1967 | Tenbrink | 73/155 |
| 3,381,523 | 5/1968 | Nettles | 73/40.5 |
| 3,385,103 | 5/1968 | Wilkerson | 73/45.5 |
| 3,498,518 | 5/1970 | Wheeler . | |
| 3,503,249 | 3/1970 | Dumond | 73/49.1 |
| 3,796,883 | 3/1974 | Smith | 250/260 |
| 3,842,659 | 10/1982 | Bacroix . | |
| 3,949,596 | 4/1976 | Hawk . | |
| 4,152,924 | 5/1979 | Mayo . | |

FOREIGN PATENT DOCUMENTS

| 1593048 | 5/1970 | France . |
| 201435 | 8/1923 | United Kingdom . |
| 212715 | 3/1924 | United Kingdom . |
| 283693 | 1/1928 | United Kingdom . |
| 706106 | 3/1954 | United Kingdom . |
| 739158 | 10/1955 | United Kingdom . |
| 762629 | 11/1956 | United Kingdom . |
| 826429 | 1/1960 | United Kingdom . |
| 989730 | 4/1965 | United Kingdom . |
| 1199919 | 7/1970 | United Kingdom . |
| 1207090 | 9/1970 | United Kingdom . |
| 1242443 | 8/1971 | United Kingdom . |

OTHER PUBLICATIONS

"Tekhnika, Kief, 1976", pp. 104,105 USSR Author's Certificate 333,431.

Primary Examiner—Anthony V. Ciarlante
Assistant Examiner—Joseph W. Roskos
Attorney, Agent, or Firm—Leydig, Voit, Osann, Mayer & Holt, Ltd.

[57] ABSTRACT

A method of testing for leaks in tubing and tube joints comprises placing within the tube to be tested a tool having spaced seals so that the seals are arranged on opposite sides of the joint to be tested in engagement at a constant pressure against the internal surface of the tubing. A search fluid such as 1 to 2% helium in air is passed through the tool under pressure and then out from the tool into the annular space between the outside surface of the tool and the inside surface of the tubing between the two seals. The presence of any helium is detected by means of a helium detector for example a mass spectrometer which has a probe extending to a gas trap surrounding the joint to be tested.

16 Claims, 8 Drawing Figures

PIPING LEAKAGE DETECTION METHOD AND APPARATUS

This invention relates to methods of and tools for testing for leaks in tubing and tubing joints.

Throughout this Specification, including the claims, the terms "tube" and "tubing" are intended to embrace pipe lengths, tubes, tubular members, ducts and the like through which fluids i.e, gases, vapours and liquids, are capable of passing.

Throughout this Specification including the claims, the expression "search fluid" is intended to include all gases and mixtures thereof, the presence of a minute amount of which is readily capable of detection and for the avoidance of doubt, embraces helium and mixtures of helium with other gases, and embraces freons and sulphur hexafluoride.

In the gas and petroleum exploration and production industry, and in geothermal installations, fluids pass under pressure through a string of tubing in a well.

This tubing passes inside an outer, casing, string and is made up of tube lengths joined end-to-end, adjacent tube lengths being interconnected by couplings or specially formed, screw-threaded, ends of the tubes themselves. It is not unusual for there to be as many as 500 joints in a string. Similar remarks apply to the casing itself and uner some operational requirements the detection of leaks in the casing string joints is also important, despite the fact that the casing is normally cemented into the well.

Sometimes a leak occurs at the joint between two tube lengths which permits the unwanted entry of fluid into the annular space between the tubing string and the casing. Such an occurrence can affect the safety requirements of well design and operation.

In order to eliminate or at least to reduce the occurrence of such leaks once in situ in a well, strings have been subjected to leak tests prior to their being lowered into the casing of a well. One such known test used in practice includes applying hydraulic pressure externally to a joint and them checking for any pressure drop in the hydraulic fluid. This known method has the disadvantage that the test does not simulate the actual operating condition of the string, that is, pressure is applied from the outside of the joint rather than the inside as would be the case during the normal operating conditions of the string. Depending upon the tubing and/or coupling thread and the mechanical seal design this test can give misleading results since the conditions are not a true reflection of actual conditions in the well.

One fundamental disadvantage of this type of test is that it cannot differentiate between a leak in the joint or a leak in the pressurizing system since its only purpose is to register a pressure drop. Another disadvantage is that the absolute accuracy is limited by the accuracy of the gauge measuring the pressure drop and the time available to register a reading which may need to be appreciable if a drop of 0.1% over one hour requires detection.

A further known leak test includes passing a gas through two tube lengths interconnected by a tube coupling and coating the coupling with a soap solution. Any leak is detected by the observation of bubbles at the leak.

This known method has not proved to be wholly satisfactory in practice because the volume of gas in such a test is large because it must substantially occupy the complete length of tube under test and several safety considerations militate against this method. Furthermore, the external condition of the tube length often prevents the establishment of a coherent film of soap solution over the area under test, thus rendering this observation technique unreliable.

It has also been proposed to test joints and tube sections by applying gas pressure internally with the aid of an obstructor tool, but the proposal involves the use of gas such as nitrogen or helium at pressures of the order of 15000 lb. square inch (1050.00 kg/sqcm) and very special safety precautions become necessary at such pressures. Moreover, the problem of isolating the section of the string (flow tubing or casing) becomes an acute problem at such pressures because of the flow properties of rubber seals (natural or synthetic). It would appear that this prior proposal inevitably required testing at these high pressures in order to simulate pressures encountered in actual use of the string, to show up any possible incipient leak and to increase the speed of detection because of the inherent delay with pressure testing. Furthermore, this prior proposal involves the use of a blocking tool approximately 34 feet long (10 meters) and the handling of such a tool presents appreciable problems. The tool is also impractical in that it has a fixed length extending over the nominal length of a tube of flow tubing or casing. In practice the length of such tubes varies by up to 25% of nominal dimensions.

In general terms, the cost of the rectification of leakage in flow tubing or a casing string is very high and the occurrence of a leak with the string in situ generally means withdrawing the string from the well. Because of this cost especial efforts are made in manufacturing tubing and couplings to avoid leaks, but nevertheless the rough conditions inherent in oil and gas field operation sometimes lead to damage and consequent leakage. It can be shown that even if a leak occurs in only one joint per thousand, the added cost of testing before the string is lowered, section by section into the well, becomes worthwhile. Nevertheless, it is desirable that the testing should be economic in terms of materials and equipment expenditure and even more importantly, that the tests should be completed rapidly and with minimum disturbance to the installation of the string.

According to one aspect of the present invention, a method of testing for leaks in tubing and tube joints comprises the steps of:

(a) locating within the tubing to be tested a tool having spaced seals so that the seals are positioned one on each side of the joint or section of tubing to be tested;

(b) actuating the tool so that the seals are deformed so as to maintain a constant pressure against the internal surface of the tubing;

(c) passing a search fluid under pressure through the tool and into the annular space between the tool and the internal surface of the tubing to be tested; and (d) detecting the presence of search fluid on the outside of the joint or tubing under test.

According to a further aspect of the present invention, a tool for performing the method defined above comprises means mounting first and second spaced annular seals of resilient material, two pistons, each piston being associated with one said seal and movable from a first, inoperative, position to a second, operative, position at which the corresponding seal engages the internal surface of the tubing so as to maintain a constant pressure against said internal surface, a first passage for delivering pressure fluid to one face of each piston for moving the pistons from their first to their second positions and a second passage for delivering a search fluid through the tool to a position on the external surface of the tool between the spaced seals, the arrangement being such that, in operation, the search fluid occupies the annular space between the external surface of the tool and the internal surface of the joint or section of piping under test between the spaced annular seals.

The invention will now be described, by way of example, reference being made to the Figures of the accompanying diagrammatic drawings in which.

Figure 1:
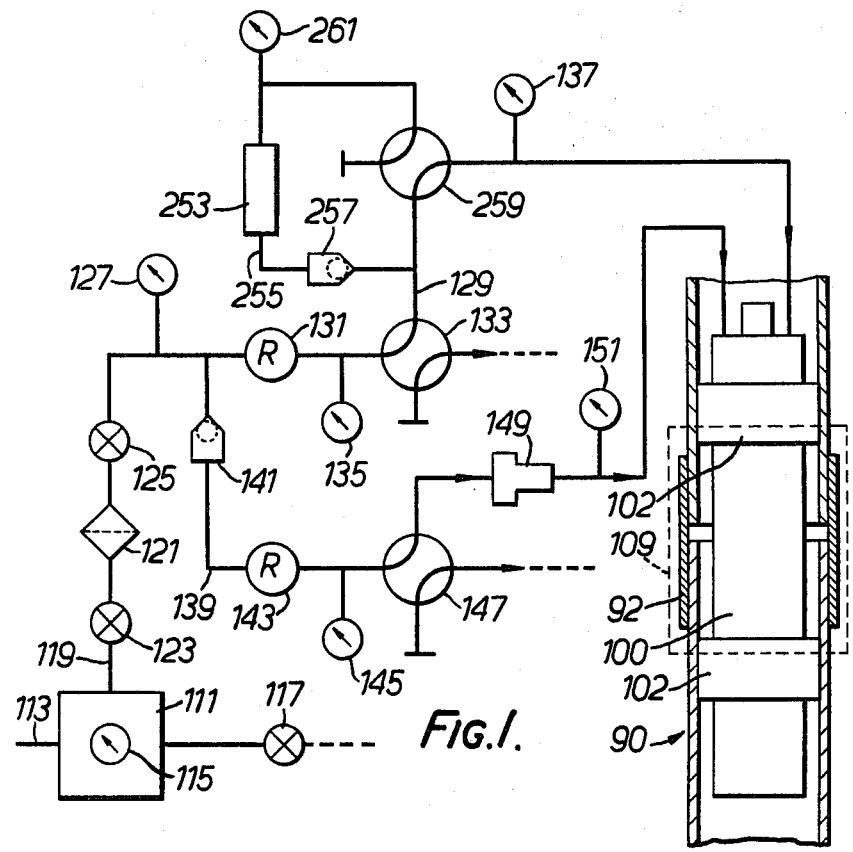
FIG. 1 is a general diagram illustrating the method and system in accordance with the invention.

The method and system in accordance with the invention will first be described with reference to FIGS. 1, 2 and 3. The string of tubing 90 to be tested, which may be flow tubing or casing is lowered progressively into a well (not shown) as is conventional and successive sections are joined together by conventional torque-applying apparatus co-operating to secure a coupling sleeve on adjacent tube lengths or directly to secure together the end portions of the tubes if the tubes are directly screw-threaded for engagement one within the other. The method can be applied to most conventional tube joints. Normally the joints will be tested at or just above deck level of the drilling rig, but it is also envisaged that, with modifications, testing can be carried out down well for the purpose of detecting the location of a leak known to exist somewhere along the length of a string.

Assuming that the joints are to be tested before lowering of the string into the well, an obstructing or blocking tool 100 is initially lowered on a cable 103 into a tube length 90 before the coupling is located. A hydraulic line 101 passes over a pulley 105 mounted on a bracket secured to a fixed point on the cable 103. When the centre point $X_2$ of the tool 100 is accurately positioned at the centre of the joint an indicator $X_1$ is applied to the line 101 in alignment with a sight 107 mounted on the winch skid. The sight 107 may take the form of a riflescope or simply a length of tubing. The tool is then removed and the joint assembled and fully torqued. The blocking tool 100 is again lowered into the pipe length and when the sight 107 and the indicator $X_1$, are accurately aligned it is known that the tool is properly located so that seals lie on either side of the joint. Other indicators on the hydraulic line can be used as shown at Y and Z for indicating higher and lower positions of the tool thus indicating the approach, from above or below, of the correct location. In practice the line 101 will include two pipes, one for hydraulic oil under pressure and one for compressed air/helium mixture (the search fluid).

The control panel on the winch skid (FIG. 6) is then operated to supply oil at a pressure 500 lb. per sq.in. (35 Kg/sq.cm.) higher (in general terms 10% higher) than that of the search gas and the seals 102 (FIG. 1) are immediately firmly applied with constant pressure to the inner surface of the tubing on either side of the joint 92 to be tested. An interlock prevents the search gas from being admitted prior to engagement of the seals and correspondingly the seals cannot be released until the search gas is exhausted. The seals 102 do not need to establish a fully fluid-tight seal against the internal surface of the tubing since the method in accordance with the invention is wholly independent of pressure drop measurement. The seals should be applied with constant pressure against the internal surface of the tubing.

Once the seals are engaged the search gas, typically 1% of helium in air is admitted at 6500 lb. sq.in. (455 Kg./sq.cm) and any leakage is detected by a rugged mass spectrometer (not shown) in communication with the collector 109 (broken lines in FIG. 1, shown in full in FIGS. 5A and 5B). The mass spectrometer is very sensitive so that small amounts of helium forming a known proportion of the search gas can be detected and by a simple calculation it is readily possible to quantify the absolute leakage rate.

The mass spectrometer operates in a standard manner but instead of the conventional arrangement in which the internal vacuum is allowed to draw in gas to be analysed through a controlled leak the instrument is operated in an overpressure viscous mode. Conventionally the trace gas is converted to positively charged particles by a glowing filament from which the particles pick up their charge. If the instrument were not operated under low vacuum $10^{-4}$ millibars or better, the filament would rapidly burn out and an excessive number of charged particles would be generated.

In the method being described any search fluid is drawn through approximately 100 ft. (31 meters) of piping by a vacuum pump and a predetermined small proportion of this search fluid is fed into the mass spectrometer through a precisely controlled leakage path. This predetermined small proportion of search fluid fed into the instrument is insufficient in quantity to affect the operation of the instrument. Because of the very high sensitivity and accuracy of a mass spectrometer, an accurate determination of the leakage rate can be calculated.

The small amount of high pressure search fluid required means that the response is rapid and the small quantity used is also desirable from the aspect of safety.

The compressor (not shown) which operates the tool and supplies the search fluid is capable of providing compressed air at 6500 lb/sq.in. (455 Kg/sq.cm). A suitable four cylinder compressor is made by Williams and James (Engineers) Ltd. of Chequer's Bridge, Gloucestershire, England and marketed under their code 170 V. The required proportion of helium is fed into the compressor intake by an appropriate injector operating substantially at atmospheric pressure. The compressor incorporates an automatic drainage device for moisture and downstream of the compressor a carbon filter is fitted which removes any remaining moisture and any oil, which at high pressures can self-ignite. The compressed mixture is delivered to the accumulator at 6500 lb.sq.in. (455 Kg/sq.cm.) and is released at 5500 lb/sq.in. (385 Kg/sq.cm.). The release causes no icing because of the careful drying and the cooling effect of the pressure drop aids in the safety of operation.

While the method is intended for leak detection, an additional test measurement feature is that any undersize drift in the internal dimensions of the tubing will be detected as the tool will not be able to pass any internal constriction. This is important because after installation any tools passed down the string are liable to jam, sometimes resulting in the costly need to raise the string.

The hydraulic circuits which enable the hereinbefore described method to be carried out will now be described with reference to FIGS. 1 and 2.

The compressed air/helium mixture from the accumulator is supplied to a manifold 111 through a line 113. The manifold is equipped with a pressure gauge 115 and a bleed outlet is controlled by a valve 117 open to atmosphere. The valve 117 will normally be closed and the manifold therefore supplies a line 119 having a filter 121 and two isolating valves 123, 125 to enable the filter to be cleaned or replaced.

Pressure in the line 119 is monitored by a gauge 127 and downstream of the gauge tapping the line divides, one branch 129 incorporating a pressure regulator 131, a four-way valve 133 and two gauges 135, 137, the other branch 139 incorporating a check valve 141, a pressure regulator 143, a gauge 145, a four-way valve 147, a pressure booster intensifier or ram 149 and a downstream gauge 151. The branch 129 supplies the gas mixture to the tool and the branch 139 supplies the gas mixture to the gas/hydraulic liquid intensifier and this liquid operates the seals 102 of the blocking tool 100. The pressure intensifier 149 ensures that at all times the pressure of the hydraulic liquid will be a predetermined value above that of the search fluid (for example 500 lb./sq.in. or 35 Kg./sq.cm) thus avoiding all risk that the search gas will build up forces at the tool capable of displacing the latter.

To ensure that the annulus between the blocking tool 100 and the coupling 92 contains only "search fluid" when the test is being conducted, the annulus is purged of air before the seals 102 are engaged by admitting a small quantity of search fluid from a purge reservoir 253 connected in a by-pass line 255 through a check valve 257.

A four-way valve 259 serves to connect and disconnect the purge reservoir. A gauge 261 monitors the pressure in the purge reservoir. Once purging has been completed the four-way valve is switched to cut off the purge reservoir.

The two four-way valves 133,147 are mechanically interlocked so that search fluid cannot under any circumstances be admitted to the tool and the annular space between it and the tubing wall until the hydraulic liquid has been supplied to activate the seals 102. Conversely, the hydraulic liquid cannot be exhausted until the search fluid has been vented.

Figure 2:
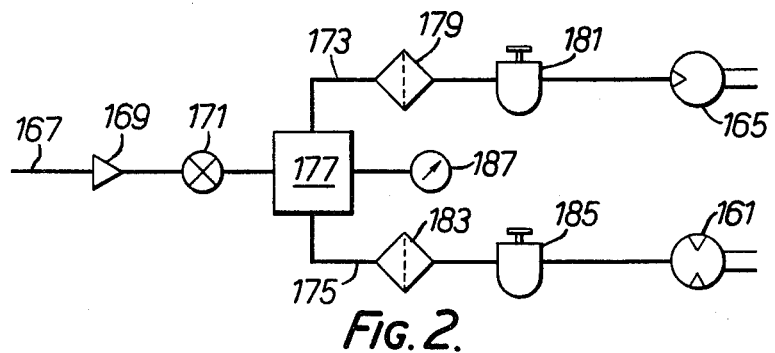
FIG. 2 is a diagram illustrating a hydraulic system incorporated in the winch skid of FIG. 6.
Figure 3:
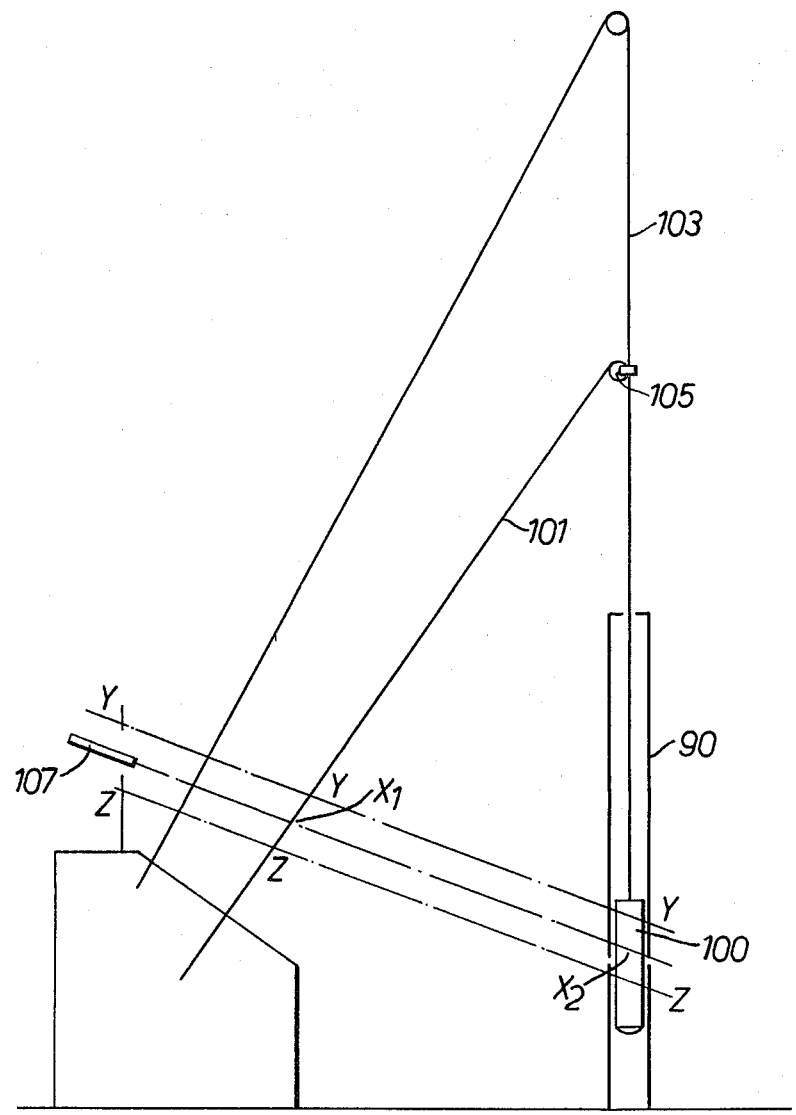
FIG. 3 is a diagram illustrating an arrangement for ensuring that a clocking tool illustrated in FIGS. 4A and 4B, is accurately located to span a joint to be tested.
Figure 6:
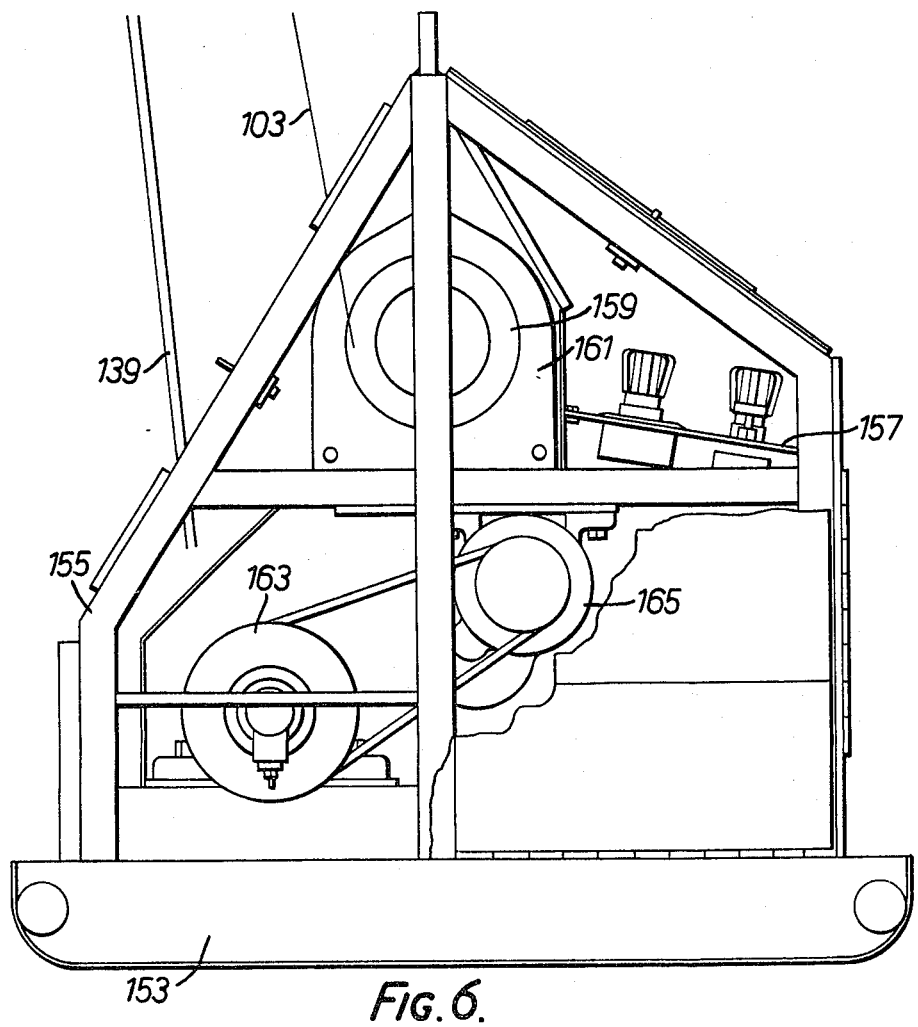

The hydraulic circuit of the winch skid 151 is illustrated in FIG. 2 and the mechanical details are shown in FIG. 6. The skid 151 includes a base 153, a framework 155 and a control panel 157 carrying parts of the hydraulic circuits of FIGS. 1 and 2. The framework supports a winch 159 for winding the cable 103 driven by an air motor 161 and a drum 163 driven by an air motor 165 permanently acting to wind in the high-pressure hoses or line 101.

The circuit of FIG. 2 comprises a line 167 connected to receive air at a rig supply pressure of for example 125 lb./sq.in. (8.75 Kg./sq.cm) and after passing through a check valve 169 and a stop valve 171 the line 167 is divided into branches 173 and 175 at a manifold 177.

The branch 173 supplies the air motor 165 through a filter 179 and lubricator 181 and the branch 175 supplies the air motor 161 through a filter 183 and a lubricator 185. A gauge 187 is connected to the manifold 177.

Figure 4A:
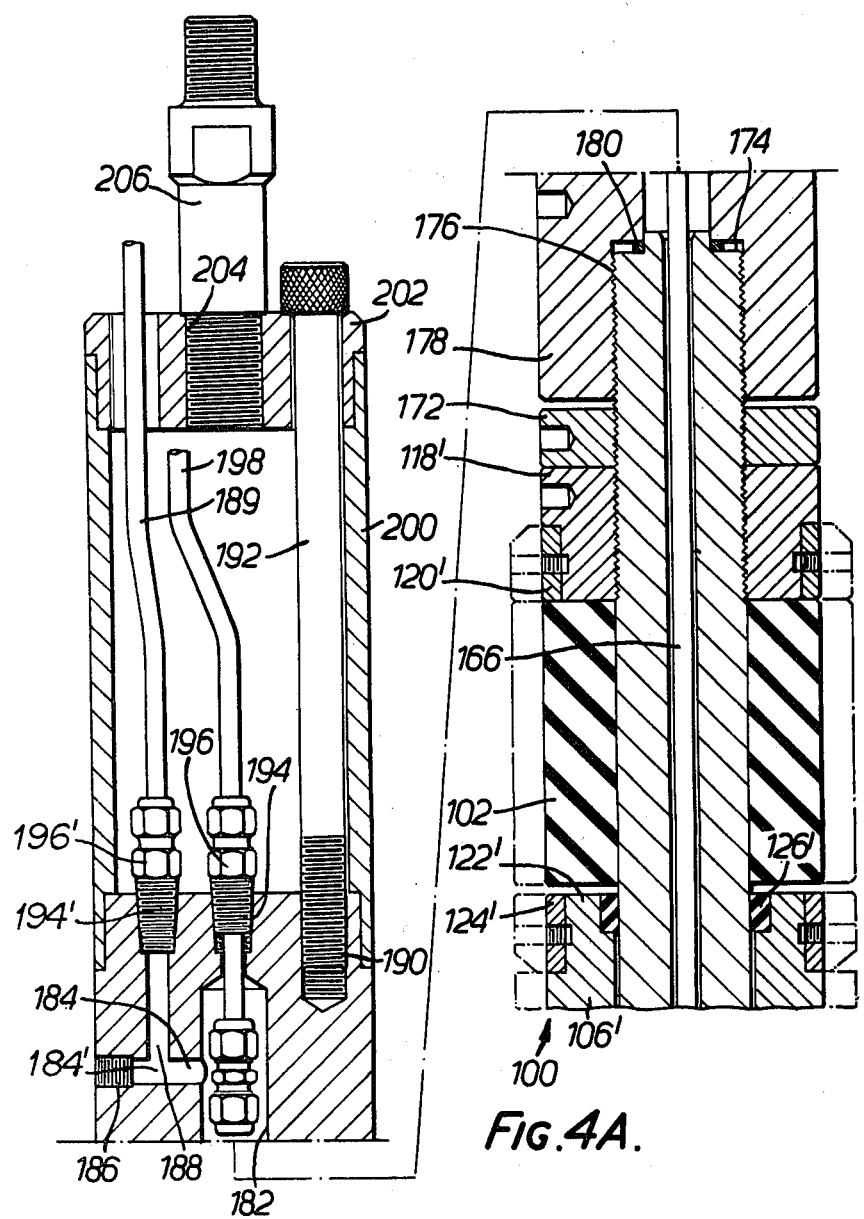
FIGS. 4A and 4B show in longitudinal section the blocking tool suitable for carrying out the method illustrated by FIG. 1.
Figure 4B:
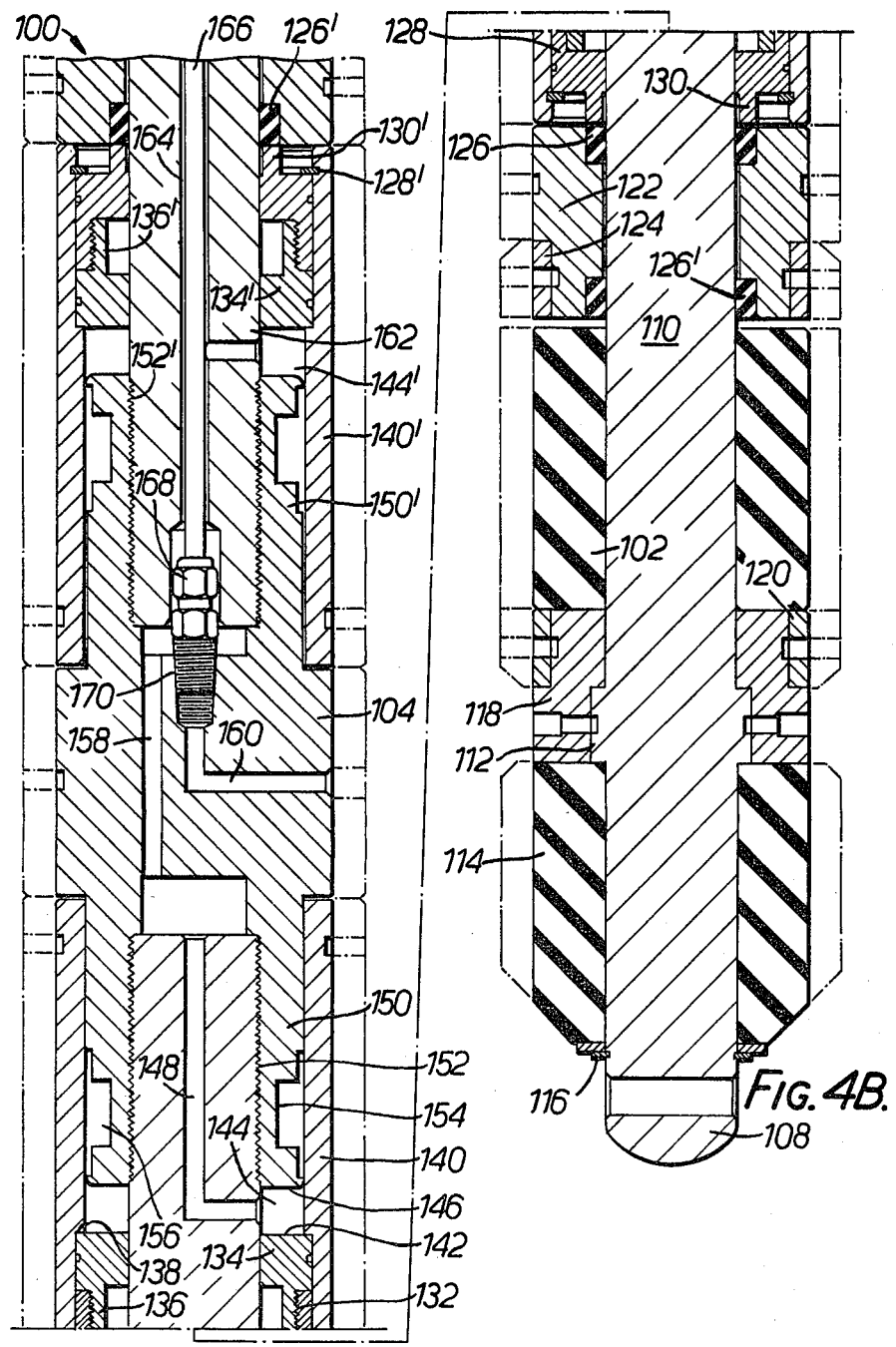

Referring now to FIGS. 4A and 4B, the blocking or obturating tool 100 is of elongate cylindrical shape and has an external diameter approximately the same as the internal diameter of the tubing joint to be tested. The seals 102 enable a range of sizes to be accommodated without basic change to the tool, but within limits, tubes of larger sizes can be tested by modifications to be described hereinafter.

The tool 100 has a centre body 104, two rams 106 and the seals 102. The tool will now be described starting from a nose 108, forming part of a lower rod 110. The lower rod 110 has an annular abutment 112 which provides a stop for a nose guide annular rubber member 114 retained by a circlip and washer assembly 116. The abutment 112 also provides a stop for an annular seal stop member 118 which itself has an annular recess receiving an anti-extrusion ring 120 which acts to prevent extrusion of the rubber of the lower seal 102. Both the annular abutment 112 and the ring 120 are secured by screw means (not shown).

The seal 102 is made of a rubber, natural or synthetic, which will resist extrusion under the pressures employed in operation. Next encountered along the length of the rod 110 is a ram 122 of annular form having an annular external recess accommodating a further anti-extrusion ring 124 and has two internal annular recesses each accommodating an annular seal 126, 126'. It will be noted that the ram is not a tight fit on the rod 110 thus avoiding fine machining tolerances.

The ram 122 is actuated by a piston assembly including a first, generally annular, piston member 128 including an annular, radially inner, but axially-extending extension 130 one end of which abuts, and has an area corresponding to the area of the adjacent seal 126. The extension 130 has a small clearance with respect to the rod 110. The piston member also has a radially-outer, but axially extending extension 132 by which it is coupled with an internal thread to a second piston member 134 having an axially-extending annular extension 136. The two piston members 128,134 thus, together form the piston assembly, the end of which remote from the ram, abuts in the rest position, as shown, an annular, internal, shoulder 138 of a sleeve 140. Each piston member 128,134 has an annular peripheral groove receiving an O-ring for example marketed under the name "Hallprene" (Registered Trade Mark). The two-part piston member enables substantial saving in manufacturing costs by enabling the omission of relatively costly machining and some weight-saving also follows.

The end face 142 of the member 134 defines one end of a pressure chamber 144 which chamber is also partly defined by the internal periphery of the sleeve 140 and by an end face 146 of the centre body 104 now to be described in detail. The chamber 144 receives pressure fluid from a passage 148 in an end portion of the rod 110.

The centre body 104 includes two, generally similar axial cylindrical extensions 150, 150' and only one will be described in full. The lower extension 150 has an axial, screwed bore 152 and this receives the end portion of the rod 110 likewise screw-threaded. The bore 152 is stepped at the inner end. Externally the extension 150 has, adjacent its free end, an annular recess 154 of T section and this accommodates a seal 156 of complementary form, for example a Hallprene Alpha seal. The outer surface of the extension 150 is made with a clearance with respect to the inner surface of the sleeve 140. The sleeve terminates just short of the step formed between the extension 150 and the centre body 104. The latter has an axial passage 158 providing communication between the inner, stepped, end portion of the bore 152 and a smaller stepped bore in the other end extension 150. A transverse passage 160 provides communication to the annular section space between the tool and the joint to be tested for the search fluid.

The screwed bore 152[1] of the upper extension 150[1] receives a screwed end portion of an upper rod 162 which has a passage 164 extending along the axis thereof accommodating a stainless steel pipe 166. The end of the pipe 166 has a nipple 168 with a thread which engages in a complementary tapered bore 170 of the centre body 104 leading to the transverse passage 160. An annular section space between the pipe 166 and the passage 164 enables pressure fluid to be communicated through the passage 158 and the passage 148 to the chamber 144.

The upper rod 162 carries an upper sleeve 140[1], an upper piston assembly, an upper seal and an upper ram 106[1], all of which parts are identical to the corresponding parts associated with the lower rod and the parts have the same reference numerals but with the addition of a prime. The upper seal stop member 118[1] is locked by a lock nut 172 since it cannot, for assembly reasons, be retained by an abutment. The upper seal stop member 118[1] is, unlike the corresponding lower member, internally screw threaded and engages a complementary thread on the upper rod 162. The upper end face 174 of the upper rod is spaced from the bottom of a screwed bore 176 of a connector block 178 and a seal 180 ensures that pressure gas cannot leak down the screwed bore. The bore 176 leads to a smaller diameter bore 182 which accommodates a union 184 of the pipe 166. The bore 176 communicates with a transverse bore 184 blanked off at 186 which in turn communicates with an axially-extending bore 188. The latter receives pressure fluid through a nipple and stainless steel tubing 189 which extends to supply tubing 139 (FIG. 1). The connector block 178 has three tapped bores 190 (only one shown), each of which receives an end portion of a bolt 192 (only one shown). Finally, the connector block 178 has bores 194, 194', each with nipples 196, 196' at ends of supply pipes 198, 189 respectively.

The tool is completed by an upper tube 200 mounted on the block 178 and secured thereto by the bolts 192. At the end remote from the block 178 the tube 200 supports a plug 202 having apertures for the passage of the bolts and a central tapped bore 204 receiving a lifter sub 206 which can be used both for raising and lowering the tool and for retrieval in the event of the tool being dropped down the string.

The tool just described is designed to operate in $4\frac{1}{2}''$ nominal diameter tubing but by the provision of a series of sleeves and larger main seals and nose ring indicated by broken lines it becomes possible to use the same basic tool for sizes up to $5\frac{1}{2}''$ diameter tubing.

As already described hereinbefore, the method relies on detecting search fluid by mass spectrometry and in theory any mass spectrometer will provide the necessary detection facility accurately and is sensitive to the particular gas used as the active component of the search fluid. A laboratory type of mass spectrometer will give excellent results but will not withstand the arduous conditions encountered on oil and gas rigs and hence a spectrometer will be used which has been specially adapted for the purpose.

Figure 5A:
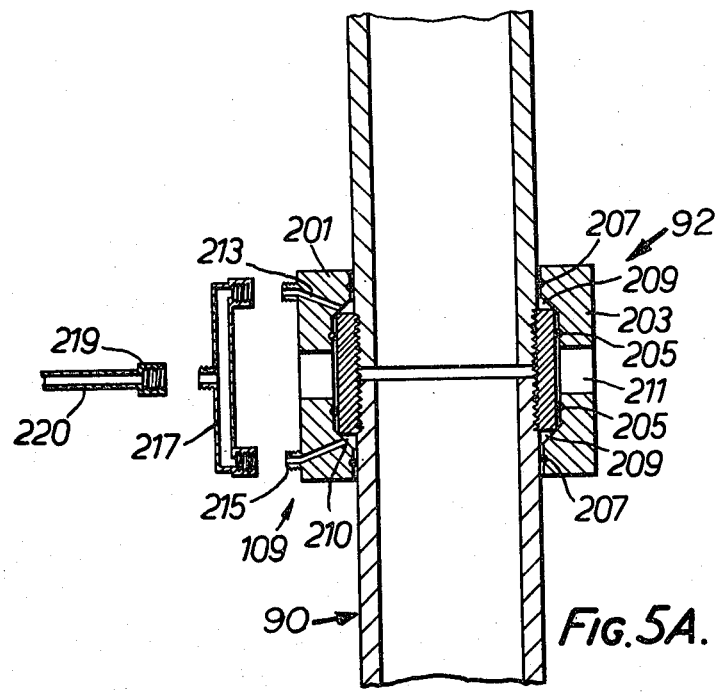
FIGS. 5A and 5B are longitudinal sections illustrating leakage gas collectors or gas traps; and, FIG. 6 is a side elevation of a winch skid used in the method in accordance with the invention.
Figure 5B:
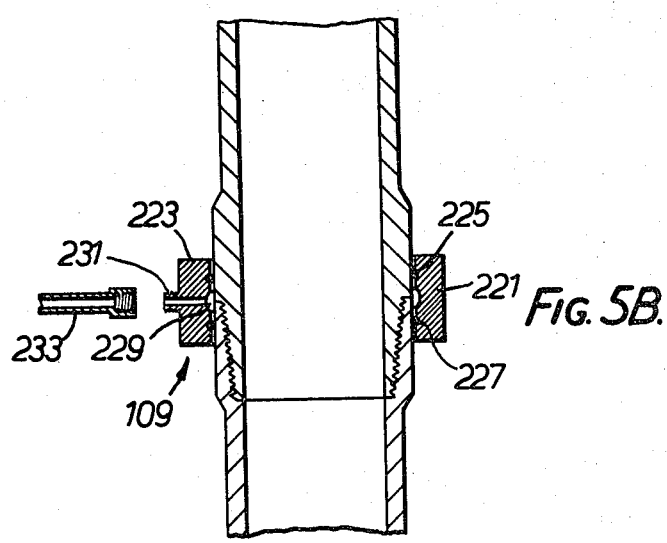

The leakage gas trap or collector 109 can be adapted to accommodate various tubing joints and FIGS. 5A and 5B illustrate two forms of trap. In FIG. 5A tubing 90 is coupled by the coupling joint 92 and the trap comprises two semi-annular parts 201,203 hinged together about a vertical axis (not shown) and when assembled about a joint, the two parts are held together by suitable securing means (not shown) diametrically opposite the hinge axis. Each part has one pair 205,207 of semi-annular O-ring seals each pair serving to seal off a space 209 which receives search fluid in the event of leakage. Holes 211 are provided between the spaces 209 to allow escape to atmosphere of any leakage gas from the lower space, which might otherwise enter the upper space 209 or vice versa. The internal surface configuration of each part 201,203 lying between the seals 205,207 is angled at 210 so that automatic location is provided for the gas trap on assembly on to the upper and lower edges of the coupling joint 92. Any leakage of search fluid into one or other of the spaces 209 is passed through passages 213 to connectors 215 (preferably of a type which can be rapidly connected and disconnected). Alternatively, the connectors 215 may be coupled to a manifold 217 which, in turn provides a connection to a mass spectrometer probe 220 by a further connector 219. This facility enables primary leak detection at a joint and secondary detection to ascertain the particular leakage path.

The trap of FIG. 5B is intended for use with a type of joint which avoids use of a coupling and involves direct threaded coupling of the tubes themselves. The trap comprises two semi-annular parts 221,223 and two semi-annular seals 225,227. A single collecting space 229 is connected to an outlet connector 231 and thus to a mass spectrometer probe 233.

In both traps, seals (not shown) are also provided which extend along the longitudinal edges of each part of the trap and these seals serve to limit leakages at these edges. It will be noted that the internal volumes of the traps are small to ensure rapid passage of any leakage search fluid to the mass spectrometer, but not so small that they become liable to blockage by any sealant or other foreign matter.

Where the pipe couplings 92 are of the type as shown in FIGS. 1 and 5A, initial location of the trap can be ensured by the chamfered internal surfaces of the trap.

In the event that the blocking tool 100 cannot readily be raised after completion of a test, application of a very high tension to the support cable could result in damage to the tool or to the string and hence it is preferable so to anchor the cable to the tool so that the anchorage will release the cable at, for example, 5000 lb. (2265 Kg.). Such overload self-release anchorages are known in themselves and need not be described in detail. The anchorage is in the form of a hollow member having an aperture large enough at one end to receive the cable, which, after insertion is splayed within the anchorage and lead poured in through the other, open, end.

The advantages of the hereinbefore particularly described method and apparatus will now be summarized.

The use of a gas, as opposed to a liquid, as the search fluid has the advantages that it has a much lower viscosity and no surface tension forces. It follows that a gas is more searching than a liquid and, moreover, has little or no tendency to seal temporarily a potential leakage path by displacing a sealing compound within a thread space. A gas is also particularly advantageous as the search fluid when a gas well string is being tested since it simulates working conditions.

Helium is preferred as the active component of the search fluid since it has a small molecule, is light and will therefore readily disperse after each test, is inert and non-toxic, is cheaper than other possible test gases and is readily available. The light nature of helium also tends to encourage passage through a leakage path. Furthermore, it is possible to construct detection equipment which is discrete for helium whereas it is difficult to achieve such discrete detection with other traces gases. The size of the molecule enables leaks to be detected when used in its pure form, which could not be detected by other trace gases.

The method considered in broader terms simulates actual conditions within a string, the amount of high pressure search fluid and tool-actuating hydraulic liquid is small thereby reducing danger in the event of a pipe fracture. The small volume of search fluid also reduces time taken to complete a test. The blocking or obstructing tool is conveniently handled, having a length of about 4 feet (just over 1 meter) and it is not necessary that the seals established by the tool at a joint should be fluid-tight. A very sensitive reading is obtainable, for example a leak rate of 1 standard cubic food (0.028 cu.M.) in ten years. The method is unaffected by temperature changes.

The tool can, within limits, be used with tubing of varying sizes and by simple adaptation can be used for tubing of a basically different size.

Overall, the method and tool provide for high safety standards while achieving an accuracy and sensitivity not previously attainable.

We claim:

1. A method of testing for leaks in tubing and tube joints comprising the steps of:
(a) locating within the tubing to be tested a tool having spaced resilient seals so that the seals are positioned one on each side of the joint or section of tubing to be tested;
(b) actuating the tool by a pressure fluid so that the seals are deformed so as to maintain a constant pressure against the internal surface of the tubing;
(c) passing gaseous search fluid at a different pressure less than that of the seal-actuating pressure fluid through the tool and into an annular space between the tool and the internal surface of the joint or section of tubing to be tested;
(d) substantially containing any said gaseous search fluid which may have leaked from the joint or section of tubing; and
(e) detecting quantitatively the presence of any contained said search fluid on the outside of the joint or section of tubing under test whereby the detecting of a leak can be effected.

2. A method as claimed in claim 1, in which the search fluid is a mixture of helium and one or more gases.

3. A method as claimed in claim 1, in which the search fluid is pure helium.

4. A method as claimed in claim 2, in which the helium forms from 0.1% to 10% by volume of the search fluid.

5. A method according to claim 1, wherein detection of leaking search fluid is effected by mass spectrometry.

6. A method according to claim 5, wherein the mass spectrometry is effected in an overpressure viscous mode.

7. A method according to claim 1, wherein the tool is actuated by a hydraulic liquid at a pressure approximately 10% higher than the pressure of the search fluid.

8. In a tool for blocking off a joint or section of tubing to enable the detection of any leaks in the joint or tubing section
first and second, spaced, annular resilient seals,
means mounting the first and second seals,
two pistons, each piston being associated with one said seal and movable from a first, inoperative, position to a second, operative, position at which the corresponding said seal is compressed and thereby engages the internal surface of the tubing so as to maintain a constant pressure against said internal surface,
means defining a first passage for delivery pressure fluid to one face of each piston for moving the pistons from their first to their second positions, and
means defining a second passage for delivering a gaseous search pressure fluid through the tool to a position on the external surface of the tool between the spaced seals,
the arrangement being such that, in operation, the search fluid, at a lower pressure than piston-actuating fluid, occupies the annular space between the external surface of the tool and the internal surface of the joint or section of tubing under test between the spaced annular seals.

9. A tool as claimed in claim 8, in which the means mounted the annular seals comprise respective axially extending rods on which the pistons can slide.

10. A tool as claimed in claim 8, in which each piston is bipartite and the tool further comprises a ram operable by the corresponding piston to engage the associated annular seal whereby to engage the seal with constant pressure against the internal surface of the tubing.

11. A tool according to claim 10, wherein each ram is a free fit on the corresponding rod and carries seals at each axial end slidably engaging the rod.

12. A tool according to claim 8, comprising means for preventing extrusion of the annular resilient seals when under pressure.

13. A tool according to claim 8, wherein each piston is dimensioned to bleed in the event of application of excess pressure.

14. A tool according to claim 8, incorporating no valve members.

15. In a tool for blocking a length of tubing or a tubing joint and defining an annular section space between the tool and the tubing,
a first annular resilient seal member,
a second annular resilient seal member,
means mounting the seal members in spaced relationship,
piston means each associated with one said seal member and each movable from a first, inoperative, position to a second, operative, position at which the associated seal member is compressed and thus engages the internal surface of the tubing so as to maintain a constant pressure against said internal surface,
means for delivering pressure fluid to one face of each piston means for moving the piston means from the first to the second positions and
means for delivering a search pressure fluid through the tool to a position on the external surface of the tool between the spaced seal members, the arrangement being such that, in operation, the search fluid occupies the annular section space between the external surface of the tool and the internal surface of the tubing under test between the annular seal members.

16. In a tool for blocking off a joint or section of tubing to enable the detection of any leaks in the joint or tubing section first and second, spaced annular resilient seals, means mounting the first and second seals, means for preventing extrusion of the material of the seals when pressurized, two bi-partite pistons, each piston being associated with one said seal and movable from a first, inoperative, position to a second, operative position at which the corresponding said seal is compressed and thereby engages the internal surface of the tubing so as to maintain a constant pressure against said internal surface, a first ram interposed between one said piston and the corresponding resilient seal, a second ram interposed between the other said piston and the corresponding resilient seal, means defining a first passage for delivering pressure fluid to one face of each piston for moving the pistons from their first to their second positions, and means defining a second passage for delivering a gaseous search pressure fluid through the tool to a position at the external surface of the tool between the spaced seals, the arrangement being such that, in operation, the search fluid, at a lower pressure than piston-actuating fluid, occupies the annular space between the external surface of the tool and the internal surface of the joint or section of tubing under test between the activated space annular seals.

* * * * *